Oct. 24, 1939.  J. H. BUCKNAM  2,177,276
HEATING, WELDING, DESURFACING, OR CUTTING PROCESS AND APPARATUS
Filed Dec. 26, 1935

INVENTOR.
JAMES H. BUCKNAM
BY
ATTORNEY.

Patented Oct. 24, 1939

2,177,276

UNITED STATES PATENT OFFICE

2,177,276

HEATING, WELDING, DESURFACING, OR CUTTING PROCESS AND APPARATUS

James H. Bucknam, Cranford, N. J., assignor to The Linde Air Products Company, a corporation of Ohio Application December 26, 1935, Serial No. 56,203

4 Claims. (Cl. 266—23)

This invention relates to the art of heating, welding, cutting, and desurfacing metals; and, more specifically, to an improved control system which is particularly adapted for use with machines which utilize gaseous heating and oxidizing agents for heating and welding, or for thermo-chemically cutting, or desurfacing ferrous metals, such as billets, plates and shapes of ferrous metal, and which system also may be employed advantageously in conjunction with other types of machines, such as those which utilize electrical heating means, e. g., the electric arc, for welding, heating, desurfacing, or cutting metals. Since this control system is especially useful with machines which employ a gaseous oxidizing jet as a metal cutting or removing medium, its application to an oxy-flame cutting machine is disclosed herein to illustrate the principles of this invention.

In the operation of oxy-acetylene cutting machines, for example, it is necessary to heat a zone of metal at the starting point to an ignition temperature before applying the jet of cutting oxygen. This cutting oxygen is controlled by a valve; and at the moment the latter is opened, it is desirable to close immediately the circuit of the motor which operates the mechanism that feeds the work or the blowpipe along the cutting line. Heretofore, these valve-opening and switch-closing operations have been performed manually by an operator who watches the preheating at the starting point. Because of his own misjudgment and other factors, the operator often performs these operations either too soon or too late, which results in the waste of both time and material and produces an unsatisfactory cut. Furthermore, during the cutting operation, the necessary preheat may suddenly fail or become insufficient, in which event the cut is "lost". This wastes considerable oxygen because the operator usually does not shut off the cutting oxygen or restore the preheating flame immediately. Finally, there may be more or less delay in closing the cutting oxygen valve at the completion of a cut, which also wastes oxygen as well as heating gas. Similar premature or delayed closing and opening of valves and control switches often occur in the starting and the stopping of heating or heat-treating, welding, and desurfacing or metal-removing operations.

The main object of this invention is to eliminate such waste and inefficiency in the operation of heating, welding, desurfacing, and cutting machines; and in prior oxy-gas desurfacing and cutting processes and machines, for example, to automatically control the metal-removing or cutting operation and the supply or stream of oxidizing gas independently of human judgment. More specifically, an object of this invention is to provide a control system for metal removing or cutting machines which shall initiate the flow of cutting oxygen and start the feed mechanism at precisely the proper instant; and which shall instantly shut off the desurfacing or cutting oxygen and stop the feed mechanism, both when the preheat is insufficient during desurfacing or cutting, and when the surface removal or cut has been completed. These and other objects and the novel features of the invention will become apparent from the following description and the accompanying drawing which discloses a typical embodiment of the invention for the purpose of illustrating the application of its novel principles but not to limit the scope of the invention. In the drawing:

Figures 1, 2:
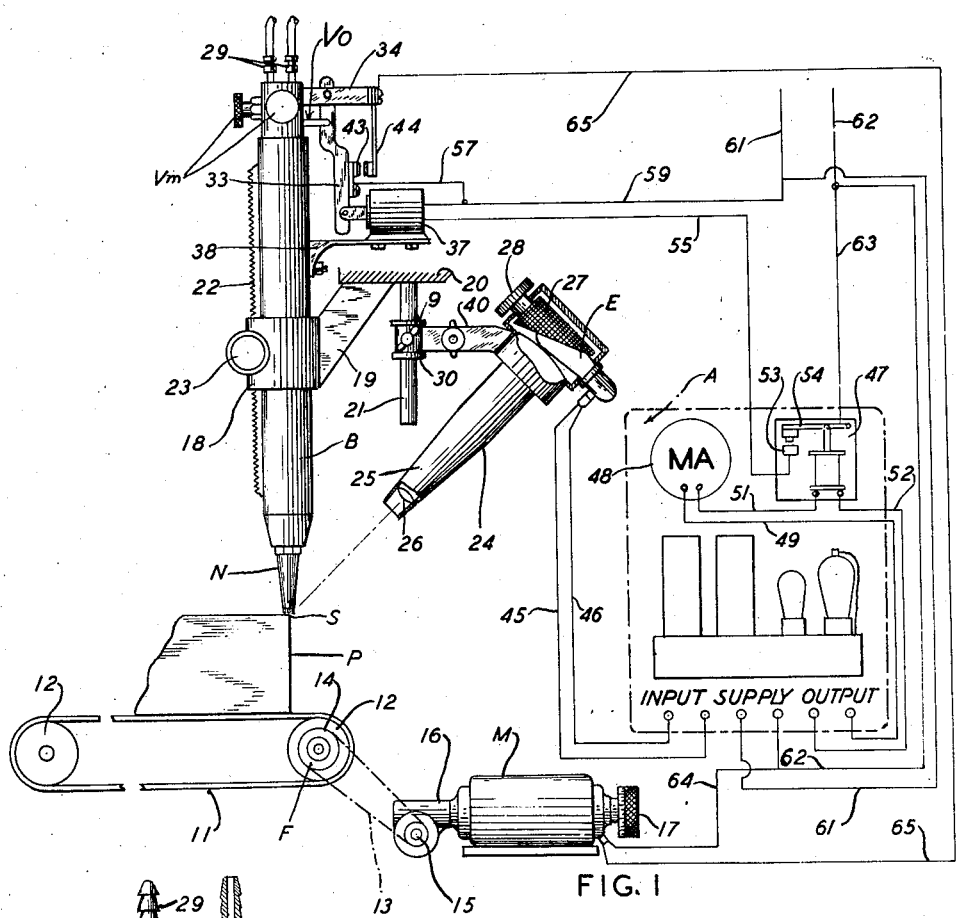
Fig. 1 is a combined schematic and diagrammatic view of one embodiment of this invention.
Fig. 2 is an enlarged diagrammatic view illustrating one way in which the control system may be used to operate a motor switch and the cutting oxygen valve of an oxy-gas cutting blowpipe.

As shown, an apparatus embodying the invention may comprise a feed mechanism F driven by an electric motor M and capable of propelling a workpiece, such as a metal plate P, at a uniform speed relatively to a stationary cutting, desurfacing, welding or heating tool such as an oxy-acetylene cutting blowpipe B. Obviously, the tool or blowpipe and its accessories may be mounted on a movable supporting structure to allow it to be propelled along and directed against successive areas along the path of the cutting, desurfacing, welding, or heating operation while the work remains stationary. The cutting blowpipe B disclosed may be of a well known type utilizing a mixture of oxygen and acetylene or other fuel gas to provide a heating flame and a stream of oxygen under pressure to provide an oxidizing or cutting jet. The flow of the heating mixture and the cutting oxygen to the blowpipe nozzle N may be regulated by independently operable valves V$m$ and V$o$.

To start or initiate a cutting operation, for example, the valves V$m$ are opened and the plate P is first locally heated at the starting point S by applying the high-temperature heating flame thereto until a localized zone of metal is preheated to an ignition temperature, whereupon the cutting oxygen valve Vo is automatically opened to project an oxidizing jet against the highly heated zone and thus produce a cut. At the same instant that the valve Vo is opened, the switch in the circuit that supplies electric current to the drive motor M is closed, and the cutting operation proceeds along the predetermined cutting line in a well known manner. When the cut is completed, or whenever the preheat in advance of the oxidizing jet is insufficient or falls below a predetermined limit, the valve Vo and the motor line switch are operated to shut off the cutting oxygen and to stop the feed mechanism. Heretofore, determining the proper moment for turning on the cutting oxygen, and starting the motor in operation have depended upon the attendant's judgment; also, at the completion of the cutting operation and at any intermediate point, it has been the attendant's duty to promptly shut off the cutting oxygen and stop the feed mechanism, both of which have required judgment and alertness on his part to avoid waste of gas and unsatisfactory results in cutting. According to this invention, these human factors are eliminated and the entire cutting operation is automatically controlled by mechanism which includes a device, such as a photoelectric cell E, that is sensitive to radiant energy, e. g., light, emitted by the heated metal at the starting point and along the cutting line. This control system is so adjusted initially that it will automatically open the cutting oxygen valve Vo and close the line switch of the motor M when a predetermined intensity of radiant energy is emitted by the heated zone; and will automatically close the valve Vo and open the motor switch when the emitted radiant energy falls below such predetermined intensity, or fails entirely as it does immediately after the cut has been completed.

Referring again to the drawing and more particularly to Fig. 1, the invention comprises a feed mechanism or conveyor F, preferably of the endless-chain or traveling-belt type, for moving a workpiece with respect to the heat-treating tool. The chain or belt 11 is mounted upon a plurality of sprockets 12 to which rotary motion is imparted by means of a belt 13, connected between a sheave 14, secured to one of the sprockets 12, and a pulley 15, forming part of the transmission or speed-reducing gear 16 of motor M. A governor 17, secured to the motor M provides for the adjustment of the motor speed and consequently the rate of conveyor movement.

A heating tool B, herein disclosed as a cutting blowpipe, is mounted free for vertical movement with respect to the conveyor F so that the cutting nozzle N may be properly positioned with respect to a workpiece or plate P. The heating tool may otherwise comprise a fuel gas blowpipe or arc welding tool to perform heat treating or welding operations. A collar 18 is secured to a supporting frame member 20 by a bracket 19. A rack 22 secured to the outer periphery of the blowpipe body extends longitudinally and meshes with a pinion extending through the sleeve 18. The pinion is adjusted by means of a thumbwheel 23 and is normally rotatable within the sleeve 18 but may be locked with respect thereto in order to securely position the blowpipe B.

A temperature indicator 24 is slidably mounted on a vertically disposed rod 21 secured to the supporting frame member 20 and is disposed in angular spaced relation to the blowpipe B. A sleeve 30 surrounds the rod 21 and is adapted to slide thereon with a thumbscrew or similar device 9 for securing the sleeve 30 in any desired position on the rod 21. An arm 40, swiveled near its midsection, joins the sleeve 30 with the housing of the temperature indicator 24. The temperature indicator comprises means sensitive to heat energy such as might issue from a spot on the plate P raised to a high temperature by the heating tool B. The temperature indicator preferably comprises a tube directed toward the heated area with a lens 26 at its forward end for focusing an image of the incandescent heated area upon means sensitive to radiant energy. A radiation pyrometer may serve as the sensitive means in which case the lens may focus an image of the heated or incandescent area as a hot, luminous spot upon the thermo-couple junction. The preferred temperature indicator as shown in Fig. 1 comprises a light-conveyor tube 25 positioned so that the forward or tapered end is adjacent to and directed toward the incandescent area of the workpiece P. A lens 26 forms an image of the incandescent area upon a photocell E at the upper end of the tube. If desired, a quartz rod extending within the tube 25 may be employed for transmitting radiations from the luminous area to the photocell. A screen 27 is selectively positioned by a dial 28 to control the area of the photocell exposed to the incandescent source, and consequently the temperature of the source necessary to produce a predetermined response of the cell.

Referring now more especially to Fig. 2, the control system is shown applied to a conventional cutting blow-pipe having gas inlet nipples 29, and fuel-mixture adjusting valves Vm. The oxygen inlet duct 31 communicates with the cutting-oxygen tube 32 when the valve Vo is open. A cutting-oxygen valve lever 33 is pivoted at its upper end in fixed relation to the blowpipe B, for example, to a post 34 secured to a bifurcation 35 on the blowpipe B. The opposite end of the lever 33 is pivotally connected to the core or armature 36 of a solenoid 37 supported with respect to the blowpipe B, as by means of a mounting bracket 38.

The valve stem 39 having the valve head 41 secured at its inner end is pivotally secured to the lever 33 at a point intermediate its two ends and preferably at approximately its mid-section. The valve head 41 and the lever 33 are urged inwardly to the normally closed position by means of a compression spring 42. A pair of contact members 43 and 44 are mounted respectively to the lever 33 and the extension 34 from which they are insulated by suitable dielectric elements.

The impulses from the photoelectric cell E are conducted through wires 45 and 46 to the input terminals of a thermionic amplifier A. The impulses are amplified by a series of tubes and are then passed from the output terminals through the solenoid coil of a sensitive current relay 47 in series with a milliammeter 48, through wires 49, 51 and 52. The relay 47 is provided with a contact member 53, and a contactor 54 pivotally mounted to the core member of the coil. A wire 55 extends from the contact member 53 to a terminal 56 of the solenoid 37, while wire 57 extends from the other terminal 58 of the solenoid 37 to the contact member 43. A wire 59 connects wire 57 with one line 61 of a source of electric current as, for instance, 110 volts of either direct or alternating current. The other line 62 of the source of electric current extends to the contact 54 through wire 63. The lines 61 and 62 are connected to the supply terminals of the amplifier A and furnish it with a source of operating current. A wire 64 connects the line 62 with one of the terminal connections of the motor M, and the remaining terminal connection is joined to the contact member 44 through wire 65.

When the apparatus is not operating, the relays and the oxygen cutting valve lever 33 are in the positions shown in Figs. 1 and 2. To set the apparatus in operation, a workpiece or plate P is first placed upon the feed mechanism F so that the edge of the plate is directly under the cutting, welding or heat-treating device B, and the latter is then adjusted vertically with the thumbwheel 23 so that it is in correct position with respect to the workpiece. For the cutting blowpipe shown, this condition obtains when the discharge end of the nozzle N is directly above the ferrous metal workpiece P at the starting point S, as shown in Fig. 1. The thumbwheel 23 is then locked to hold the blowpipe in fixed position. The temperature indicator 24 is then adjusted angularly by means of the swiveled arm 40 and vertically by moving the sleeve 30 upon the rod 21 until the indicator is focused upon a part of the area to be heated. The position of the screen 27 is next adjusted by means of the dial 28 which is preferably provided with calibrations in terms of temperature if desired. In the case of a flame-cutting operation, the screen 27 is preferably adjusted to the kindling temperature of the metal forming the plate P. For welding, flame-hardening, or other heat treating operations, the screen 27 is adjusted so that the photocell E may be properly illuminated or energized at the desired temperature.

With the adjustments completed, the mixture of the preheating jet is correctly proportioned by means of the valves $Vm$, and the preheating mixture is ignited. When the temperature of the plate P is raised sufficiently, a portion or zone thereof becomes luminous or incandescent, and energy radiated from the area is conducted through the lens 26 to the photocell E. When the proper cutting temperature has been reached, the responses of the photocell E, fed to the amplifier and magnified thereby, are strong enough to energize the relay 47 and cause the contactor 54 to engage contact 53. The solenoid 37 is thus connected with the source of electric current and becomes energized. The core 36 is thus drawn within the coil pulling the lever 33 away from the blowpipe B, opening the cutting oxygen valve Vo and at the same time closing the contact members 43 and 44, thus completing the circuit of the electric motor M and setting it in motion. It will thus be seen that when the photocell E receives sufficient excitation, the cutting oxygen valve Vo and the motor which drives the feed mechanism are instantaneously and automatically operated, and the stream of oxygen is applied to the workpiece P at the exact moment that it is needed. In heat-treating operations, the responses from the photocell set and maintain the conveyor in motion thus moving the workpiece with respect to the heat source when the metal has reached the desired temperature.

As the stream of cutting oxygen is applied to the workpiece P, the conveyor propels the workpiece past the blowpipe B. The speed of the motor M may be adjusted by means of the governor 17, for example, so that the rate at which the conveyor travels will be substantially equal to the maximum cutting rate. Should the workpiece P move at too fast a rate past the blowpipe B, the metal would not be maintained at the ignition temperature by the preheating flames and the metal oxidizing reaction, and the cut would ordinarily be "lost". At the very instant, however, that the cut would be "lost", the photocell focused on the heated area receives insufficient radiation to keep the contacts closed and the valve Vo open. As a result the stream of cutting oxygen is immediately interrupted and the motor M stopped so that the workpiece P ceases to move with respect to the blowpipe until the preheating flames have raised the heated area to the ignition temperature, at which time the cutting oxygen again flows and the feed mechanism continues the movement of the workpiece P. In this way, the application of cutting oxygen is controlled by the radiant energy emission of the preheated area, so that the oxidizing jet is never delivered to the workpiece P until the temperature has been raised to the ignition point, at which time the cutting operation progresses automatically. When the workpiece P reaches the end of its travel and the cut has been completed, there is no longer a heated area to energize the photocell E, whereupon the oxidizing jet is automatically shut off and the motor circuit is automatically opened to stop further travel of the conveyor F and the work P in response to the controlling effect of the photocell.

As previously stated, the principles of this invention are not limited to the particular apparatus or operation specifically disclosed herein, but such principles may be applied generally to automatically control machines employing heating and/or oxidizing agents for ferrous metal heating, welding, desurfacing or cutting operations. Such desurfacing and cutting operations are, broadly considered, metal removing operations because the cutting jet removes metal in cutting a kerf through a billet or plate to sever the same, whereas the desurfacing jet removes metal from the surface of a billet or plate in desurfacing such metal bodies. Both jets are oxidizing jets and, before applying either of them to the metal body, the metal at the starting point should be heated to an ignition or kindling temperature and such temperature should be maintained at the point of impingement of the oxidizing jet during the entire operation. The velocity of the cutting oxygen jet is high—substantially above 1000 feet per second, and it is usually applied almost perpendicularly to a surface of the metal body; whereas the velocity of the desurfacing oxygen jet is considerably lower—preferably between 200 and 1000 feet per second, and it preferably is applied at an angle of 15°–35° to the surface of the body to be desurfaced.

Various changes may be made in the details and adjustments of the mechanism disclosed herein without departing from the broad principles of this invention. For example, while the heating, welding, desurfacing, or cutting tool is disclosed as a single oxy-acetylene blowpipe, it will be obvious that a plurality of tools or oxy-fuel gas blowpipes may be used together on the same workpiece and controlled according to this invention to perform a desired operation.

I claim:

1. Process of heating, welding, desurfacing, or cutting a ferrous metal article along a predetermined line which comprises locally heating the metal article at the starting point of said line; initiating relative movement between said metal article and the source of heat photo-electrically in response to a predetermined intensity of radiant energy emitted by the heated area at the starting point, to thereby progressively heat successive portions of said article along said line; and stopping said relative movement at any point along said line photo-electrically in response to a decrease to below such predetermined intensity of emitted radiant energy.

2. A process of desurfacing or cutting successive portions of a ferrous metal body which comprises applying a source of heat to locally heat an area of said body at a starting point; initiating the flow of a jet of oxidizing gas against said locally heated area photo-electrically in response to a predetermined intensity of radiant energy emitted by said area; and simultaneously with the initiation of said flow, initiating movement of said body with respect to said source of heat and said jet of oxidizing gas.

3. Process of desurfacing or cutting a ferrous metal body which comprises applying a high-temperature flame to said body to heat the same to an ignition temperature; moving said flame and said body relatively to one another to heat successive portions of said body along a predetermined path; directing a stream of cutting oxygen onto such successively heated portions during such movement; stopping such movement and the flow of cutting oxygen photo-electrically when the temperature of the heated portion falls substantially to a point at which ignition no longer continues; and starting such movement and the flow of cutting oxygen photo-electrically when the temperature of the heated portion rises to such ignition point.

4. Apparatus for desurfacing or cutting a ferrous metal body which comprises means for applying a high-temperature flame to said body to heat a localized area thereof to an ignition temperature; means for moving said flame and said body relatively to one another to heat successive areas of said body along a predetermined path; means for directing a stream of cutting oxygen onto such successively heated areas; and photo-electrically actuated means for stopping such movement and the flow of cutting oxygen when the temperature of a heated area falls substantially to a point at which ignition of the metal body no longer continues, and for starting such movement and the flow of cutting oxygen when the temperature of the heated area rises to such ignition point.

JAMES H. BUCKNAM.